Sept. 12, 1939.   A. G. F. WALLGREN   2,172,486
BEARING
Filed March 27, 1936

INVENTOR.
August Gunnar Ferdinand Wallgren
BY
his ATTORNEY.

Patented Sept. 12, 1939

2,172,486

UNITED STATES PATENT OFFICE 2,172,486

BEARING

August Gunnar Ferdinand Wallgren, Stockholm, Sweden, assignor, by mesne assignments, to Aktiebolaget Nomy, Lidkoping, Sweden, a corporation of Sweden Application March 27, 1936, Serial No. 71,082
In Sweden April 2, 1935

7 Claims. (Cl. 308—73)

My invention relates to sliding bearings and particularly to bearings of this type wherein the load is transmitted from a rotating to a stationary part by means of a plurality of blocks which are arranged so as to be able to tilt in order to provide wedge-shaped spaces between the bearing surfaces wherein is formed a wedge-shaped layer of lubricant.

One of the objects of my invention is to provide means whereby the aforesaid blocks may be supported directly on a shaft without the interposition of any special bearing ring or the like.

Another object of my invention is to provide means for lubricating the upper part of a bearing of this type, especially when used in connection with a shaft rotating at a slow speed.

Further objects and advantages of my invention will be apparent from the following description considered in connection with the accompanying drawing which forms a part of this specification and of which:

Figure 1:
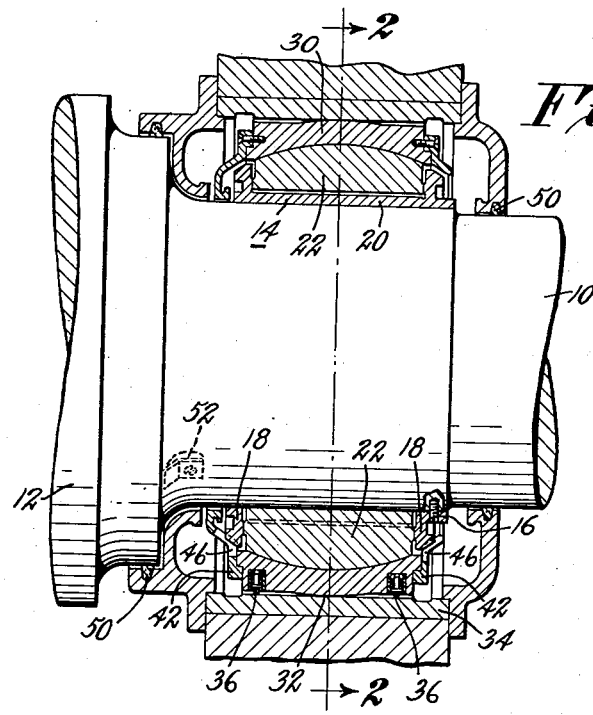
Fig. 1 is a cross-sectional view of a preferred embodiment of my invention and is taken on the line 1—1 of Fig. 2.

Referring to the figures, reference character 10 designates a rotatable shaft. In the embodiment illustrated, this shaft supports a roll 12 of a rolling mill. Mounted on shaft 10 is a bearing block retaining cage 14 which may be secured against rotation relative to the shaft by means of setscrews 16. Cage 14 comprises spaced parallel rings 18 which encircle the shaft, and axially extending and circumferentially spaced bars 20 which connect the two rings together. Bearing blocks 22 are retained between rings 18, the sides of the blocks being formed with surfaces 24 which cooperate with guiding surfaces 26 formed on the rings to prevent axial displacement of the blocks. Surfaces 26 on rings 18 are radially outside of bars 20 so that the surface on each ring may be continuous and may be made in one continuous turning or grinding operation which results in a precision not easily attainable in the case of a plurality of separately ground surfaces. These blocks are formed with radial inner supporting shoulders 28 which contact shaft 10 between the bars 20. As will be noted from Fig. 2, these shoulders are closer to the trailing ends of the blocks than they are to the leading ends, the bearing being intended for rotation only in the direction of the arrow.

The outer radial surfaces of block 22 are spherical and cooperate with an inner spherical bearing surface formed on a rotationally stationary bearing ring 30. The central part 32 of the outer surface of ring 30 is likewise spherical and is supported within a bearing housing 34. This spherical formation of portion 32 makes it possible for ring 30 to tilt slightly within the housing in order to permit slight axial displacement of the bearing in known manner. This tilting is resisted and limited by means of pins 36 retained within sleeves 38 located in recesses adjacent either end of ring 30. Springs 40 tend to force pins 36 outwardly and hence resist the inward movement of the pins caused by tilting of ring 30.

Annular rings 42 are secured to either end of ring 30 and are formed with central openings bounded by conical flanges 44. These flanges are closely spaced to similar flanges formed on rings 18 of cage 14 and cooperate therewith to retain oil within the bearing proper during rotation. Rings 42 are formed with openings 46 in their lower parts in order to permit gravity flow of lubricant into the bearing proper from the lubricant reservoir formed in the bottom of bearing housing 34 below the shaft.

Due to the location of projections 28 on the blocks 22 rearwardly of the center of the blocks, the blocks are eccentrically loaded with the greater part of the load being applied near their trailing ends. This results in a slight tilting of the blocks so as to form a wedge-shaped space between the bearing surface on each block and the ring 30, the greatest width of this space being adjacent to the leading edges of the block. This permits, during rotation of the blocks, the formation of wedge-shaped films of lubricant between the bearing surfaces which effectively prevents direct metal-to-metal contact. The inner radial surfaces of the blocks are formed with recesses or notches which receive the edges of bars 20 so as to prevent the blocks from falling out of the cage even when the bearing is removed from the shaft 10, but so as not to interfere with the above described tilting of the blocks.

The leading and trailing edges of one or more of the blocks are formed obliquely with respect to radial lines in such a manner that the radially inner edges of the ends of the blocks are forward of the radially outer edges of the ends with respect to the direction of rotation of the blocks. This results in the formation of a pocket between adjacent blocks which, when these blocks are in the lower part of the bearing are closed at the bottom by the bearing ring 30 and opened at the top. However, as the blocks rotate to the upper part of the bearing, these pockets are turned upside down, so to speak, whereby they are open at the bottom. As shown, pockets of this nature are formed between each of the blocks, but for purposes of lubrication alone it would be sufficient if the ends of only certain of the blocks are formed in this manner. However, from a standpoint of uniformity in manufacture, it is preferable that all of the blocks be shaped similarly, whereby pockets of this type are formed between each of them.

In order to prevent escape of lubricant from the bearing housing 34, lubricant packings 50 may be provided, and if desired, oil-wiping member 52 may be arranged at the side of the bearing adjacent the roll 12.

If it is desired to prevent entirely axial displacement of the bearing, the ring 30 may be rigidly secured in place within the bearing housing in well known manner. In rolling mills of this nature, it is preferable to provide one end of the roll with a non-displaceable bearing and the other end with a displaceable bearing as shown in Fig. 1 in order to allow for expansion and contraction of the shaft due to temperature changes.

Figure 2:
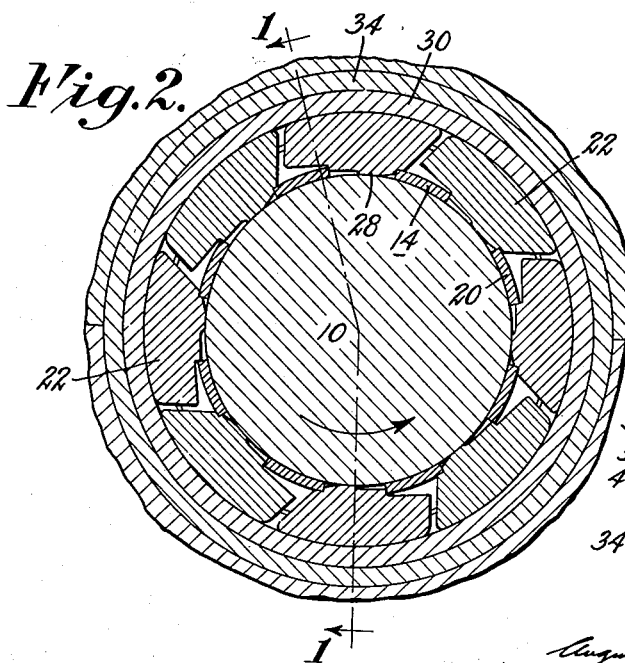
Fig. 2 is a cross-sectional view taken on the line 2—2 of Fig. 1.
Figure 3:
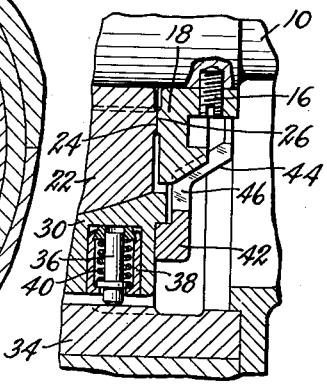
Fig. 3 is a cross-sectional view showing a portion of the device illustrated in Fig. 1. on an enlarged scale.

The operation of the above described device is as follows:

Upon rotation of the shaft 10 in the direction indicated by the arrow in Fig. 2, the bars 18 of the cage 14 causes the blocks 22 to rotate with the shaft. Due to the eccentric loading of these blocks, wedge-shaped oil films are formed between the bearing surfaces thereon and the bearing surfaces of ring 32, as previously explained. Bearing housing 34 is filled with lubricant to some level below the lower side of shaft 10 and this lubricant flows through openings 46 in rings 42 and lubricates the bearing surfaces below the lubricant level. This lubricant also fills the pockets formed between adjacent bearing blocks when these blocks are in the lower part of the bearing and this lubricant is retained in the pockets and carried upwardly as the blocks rotate. Due to the oblique formation of the ends of the blocks this lubricant cannot escape by gravity until the blocks reach the upper part of the bearing. When the blocks do reach this position the lubricant flows from these pockets by gravity and thus provide lubricant for the bearing surfaces well above the level of lubricant in the housing. This is particularly important in rolling mill bearings inasmuch as the pressure from adjacent rolls may cause any particular bearing to be loaded in its upper part rather than its lower part.

Furthermore, the speed of rotation of rolling mills is such that the centrifugal force is apt not to be sufficient to retain an annular rotating ring of lubricant within the bearing proper. However, the provision of the aforesaid pockets assures that lubricant will be positively carried to the upper parts of the bearings.

It will also be seen that the provision of cage 14 makes it possible to support the bearing blocks directly on the shaft, thus obviating the necessity of an inner bearing ring. This of course reduces the total diameter of the bearing.

While I have shown one more or less specific embodiment of my invention it is to be understood that it is done for purposes of illustration only and that the scope of my invention is not to be limited thereby but is to be determined by the appended claims when viewed in the light of the prior art.

What I claim:

1. In a bearing for a rotatable shaft, a rotationally stationary bearing member formed with a bearing surface, load transmitting elements, and means for causing said elements to rotate with and at the same speed as said shaft, said elements being formed with bearing surface having sliding cooperation with the surface on said member, the forward end of at least one of said elements being formed so as to carry lubricant during rotation, at low speed and independently of centrifugal force from the lower part of the bearing to the upper part and to discharge the lubricant in the upper part of the bearing.

2. In a bearing for a rotatable shaft, a bearing housing forming a lubricant reservoir in the lower part thereof, a rotationally stationary bearing member within said housing and formed with a bearing surface, load transmitting elements, and means for causing said elements to rotate with and at the same speed as said shaft, said elements being formed with bearing surfaces having sliding cooperation with the surface on said member, the forward end of at least one of said elements being formed so as to carry lubricant during rotation at low speed and independently of centrifugal force from said reservoir to the upper part of said bearing and to there discharge the lubricant.

3. In a bearing for a rotatable shaft, a rotationally stationary bearing member formed with a bearing surface, load transmitting elements, and means for causing said elements to rotate with and at the same speed as said shaft, said elements being formed with bearing surface having sliding cooperation with the surface on said member, the leading end of at least one of said elements being oblique with respect to a radial line so as to form with said member a pocket which receives lubricant in the lower part of said bearing, and upon rotation of said element, carries said lubricant to the upper part of the bearing and there discharges it by gravity.

4. In a bearing for a rotatable shaft, a rotationally stationary bearing member formed with a bearing surface, load transmitting elements, and means for causing said elements to rotate with and at the same speed as said shaft, said elements being formed with bearing surface having sliding cooperation with the surface on said member, the trailing end of at least one of said elements being inclined with respect to a radial line with the radially inner edge of said end forward of the radially outer edge, and the adjacent leading end of the adjacent element being substantially parallel with said trailing end, whereby there is formed a pocket between said elements open at the top and closed at the bottom by said bearing member when said elements are in the lower part of said bearing, said pocket being open at the bottom when said elements are in the upper part of said bearing.

5. In a bearing for a rotatable shaft, a rotationally stationary bearing member formed with a bearing surface, load transmitting elements, and means for causing said elements to rotate with and at the same speed as said shaft, said elements being formed with bearing surface having sliding cooperation with the surface on said member, the leading end of at least one of said elements being oblique with respect to a radial line with the radially inner edge of said end forward of the radially outer edge.

6. In a bearing for a rotatable shaft, a rotationally stationary bearing member formed with a bearing surface, load transmitting elements, and means for causing said elements to rotate with and at the same speed as said shaft, said elements being formed with bearing surface having sliding cooperation with the surface on said member, the leading and trailing ends of said elements being oblique with respect to radial lines with the radially inner edges of said ends forward of the radially outer edges.

7. In a bearing for a rotatable shaft, a rotationally stationary bearing member formed with a spherical bearing surface, a plurality of bearing blocks disposed between said shaft and said member and having spherical bearing surfaces cooperating with the spherical bearing surface on said member, whereby both radial and axial loads may be transmitted, said blocks having eccentrically located supporting projections directly contacting said shaft, and a cage secured to said shaft comprising axially spaced rings connected by axially extending elements, said elements extending between said projections and between said shaft and said blocks and serving to carry said blocks in rotation with said shaft, and said rings being formed with guiding surfaces radially outside of said elements for contacting opposite sides of said blocks for preventing axial movement of the blocks.

AUGUST GUNNAR FERDINAND WALLGREN.